US012639359B1

(12) United States Patent
Anderson et al.

(10) Patent No.: US 12,639,359 B1
(45) Date of Patent: May 26, 2026

(54) AUTOMATED SUPPORT SUB-TOPIC CLASSIFICATION USING LARGE LANGUAGE MODELS

(71) Applicant: INTUIT INC., Mountain View, CA (US)

(72) Inventors: Wendy Sen Anderson, Mountain View, CA (US); Kelsey Conophy, Mountain View, CA (US); Xiaobei Wu, Mountain View, CA (US); Gregory Joseph Viviano, Mountain View, CA (US); Noel Fernandes, Mountain View, CA (US); Katherine Vanessa Wurtzell, Mountain View, CA (US); Byungkyu Kang, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/065,466

(22) Filed: Feb. 27, 2025

(51) Int. Cl.
G06F 16/00 (2019.01)
G06F 16/35 (2019.01)
G06F 40/284 (2020.01)

(52) U.S. Cl.
CPC ............ *G06F 16/35* (2019.01); *G06F 40/284* (2020.01)

(58) Field of Classification Search
CPC ............................... G06F 16/35; G06F 40/284
USPC ................................................... 707/600–899
See application file for complete search history.

(56) References Cited

U.S. PATENT DOCUMENTS

| | | | | |
|---|---|---|---|---|
| 12,093,846 | B1 * | 9/2024 | Xue ..................... | G06F 16/3329 |
| 2025/0211549 | A1 * | 6/2025 | Arunachalam ......... | H04L 51/02 |
| 2025/0217603 | A1 * | 7/2025 | Mangalam ............ | G06F 40/284 |
| 2025/0292262 | A1 * | 9/2025 | Noor ..................... | G06Q 30/016 |
| 2025/0317533 | A1 * | 10/2025 | Shernan ................. | H04N 7/155 |
| 2026/0064789 | A1 * | 3/2026 | Van Wie ............. | G06F 16/9535 |

* cited by examiner

*Primary Examiner* — Michelle N Owyang
(74) *Attorney, Agent, or Firm* — DLA PIPER LLP US

(57) ABSTRACT

A method and system for automated support sub-topic classification using large language models (LLMs). The method includes collecting user transcripts and LLM-generated summaries, performing unsupervised learning to identify common themes, generating sub-topics, and creating labeled datasets. A supervised learning model is trained to categorize user transcripts into the identified sub-topics. The system performs categorization of new user queries and generates appropriate action responses.

20 Claims, 8 Drawing Sheets

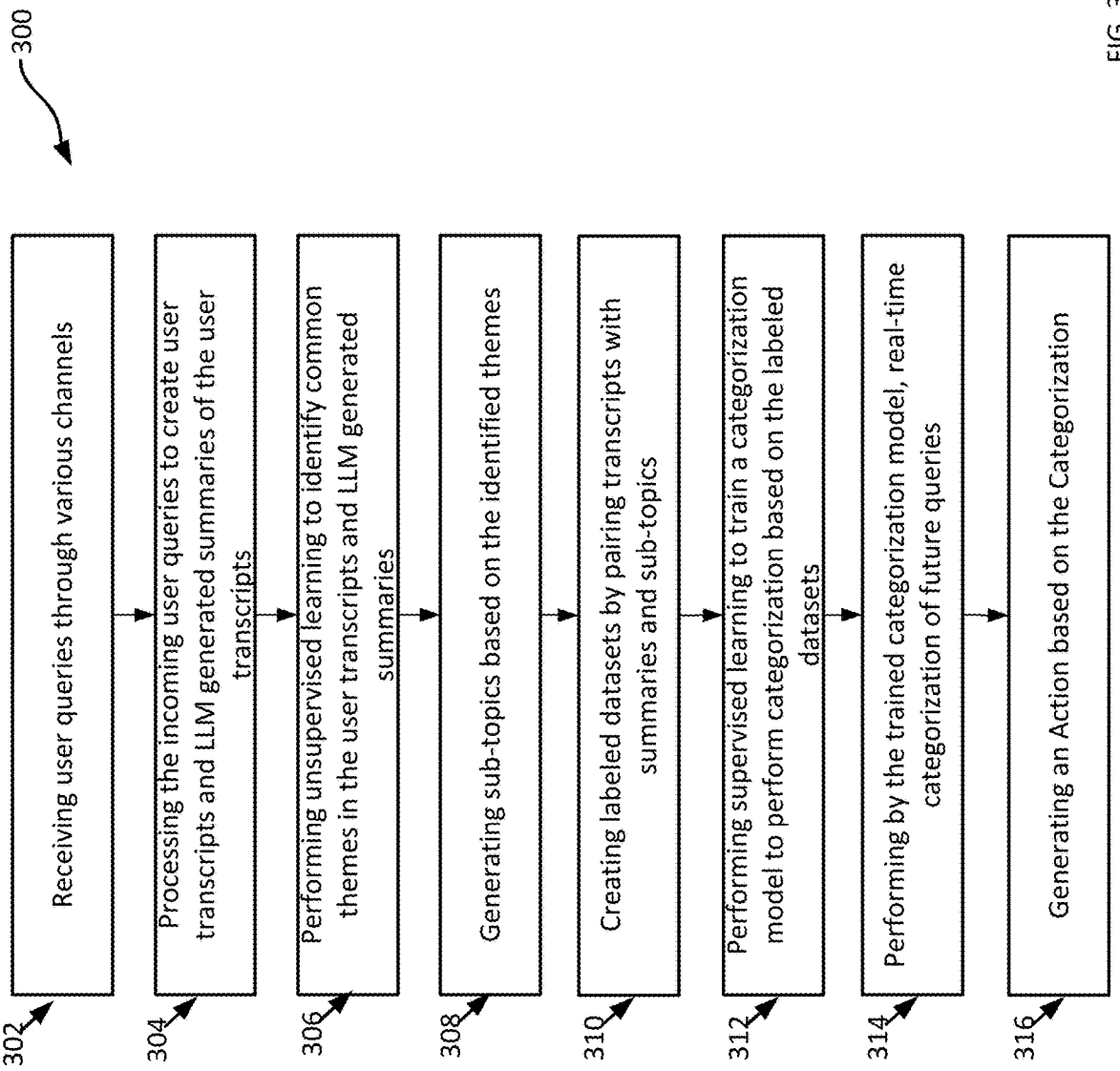

300

302 Receiving user queries through various channels

304 Processing the incoming user queries to create user transcripts and LLM generated summaries of the user transcripts 306 Performing unsupervised learning to identify common themes in the user transcripts and LLM generated summaries 308 Generating sub-topics based on the identified themes 310 Creating labeled datasets by pairing transcripts with summaries and sub-topics 312 Performing supervised learning to train a categorization model to perform categorization based on the labeled datasets 314 Performing by the trained categorization model, real-time categorization of future queries 316 Generating an Action based on the Categorization

FIG. 3

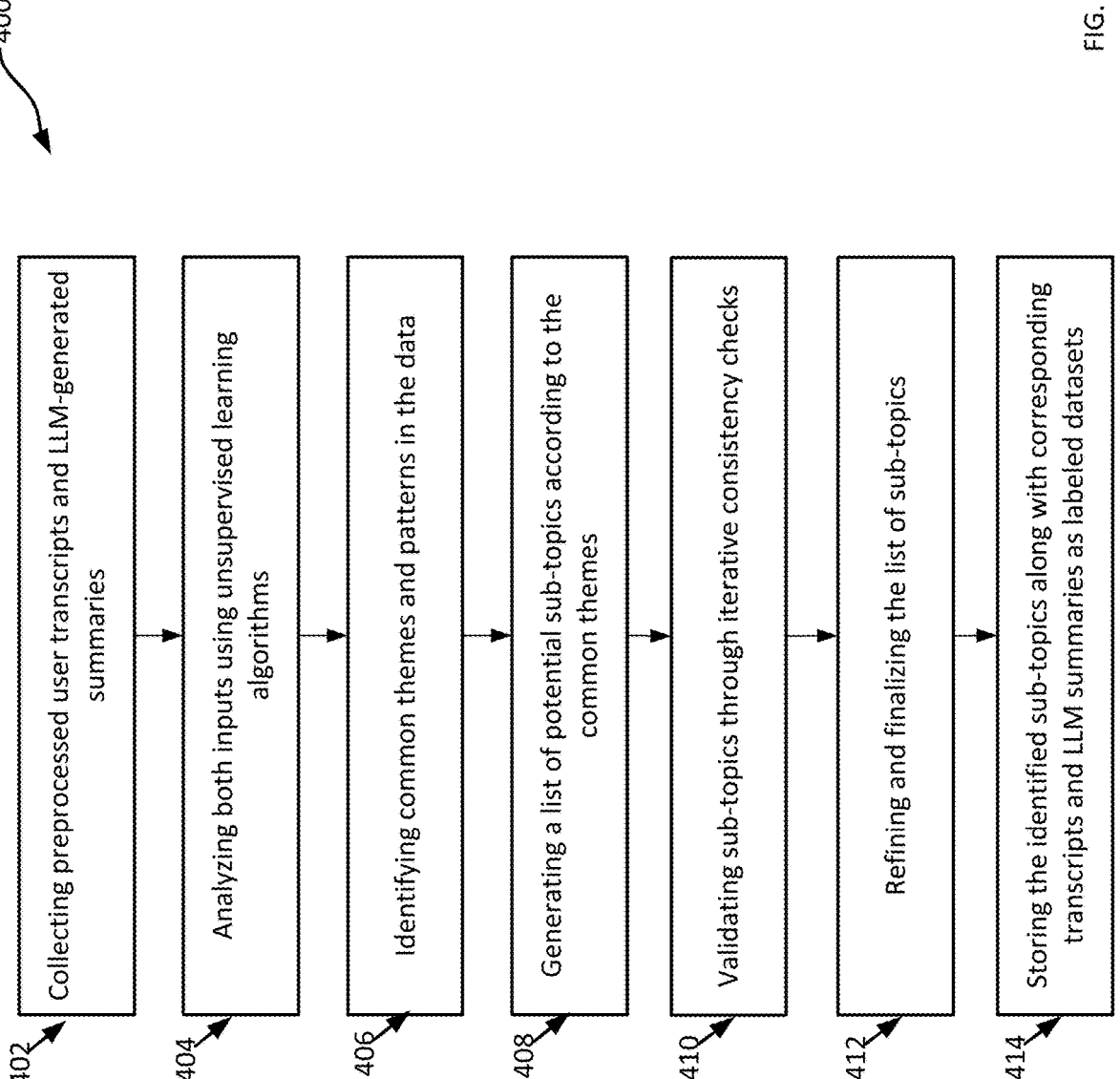

402 Collecting preprocessed user transcripts and LLM-generated summaries

404 Analyzing both inputs using unsupervised learning algorithms

406 Identifying common themes and patterns in the data

408 Generating a list of potential sub-topics according to the common themes

410 Validating sub-topics through iterative consistency checks

412 Refining and finalizing the list of sub-topics

414 Storing the identified sub-topics along with corresponding transcripts and LLM summaries as labeled datasets

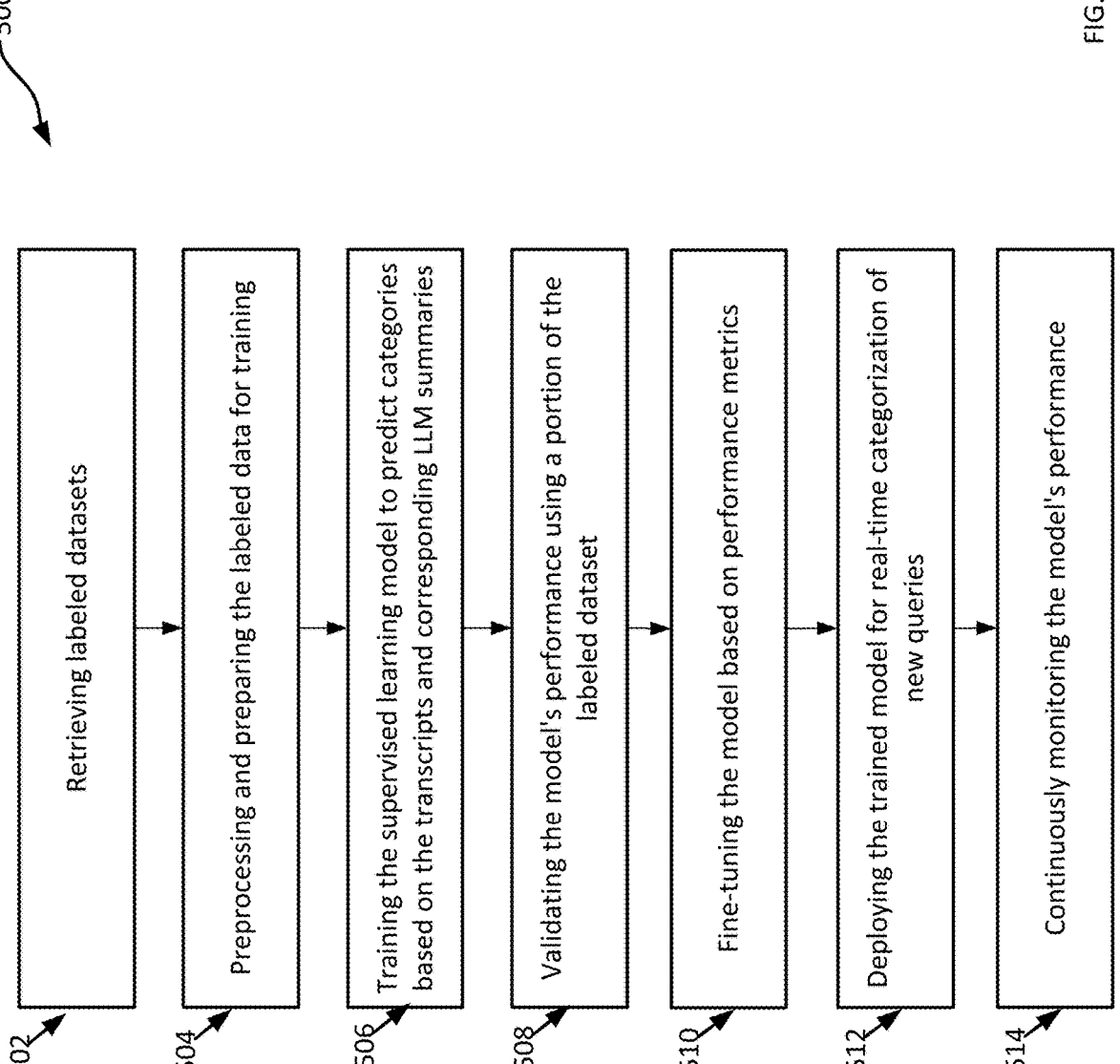

500

502 Retrieving labeled datasets

504 Preprocessing and preparing the labeled data for training

506 Training the supervised learning model to predict categories based on the transcripts and corresponding LLM summaries 508 Validating the model's performance using a portion of the labeled dataset 510 Fine-tuning the model based on performance metrics 512 Deploying the trained model for real-time categorization of new queries 514 Continuously monitoring the model's performance

FIG. 5

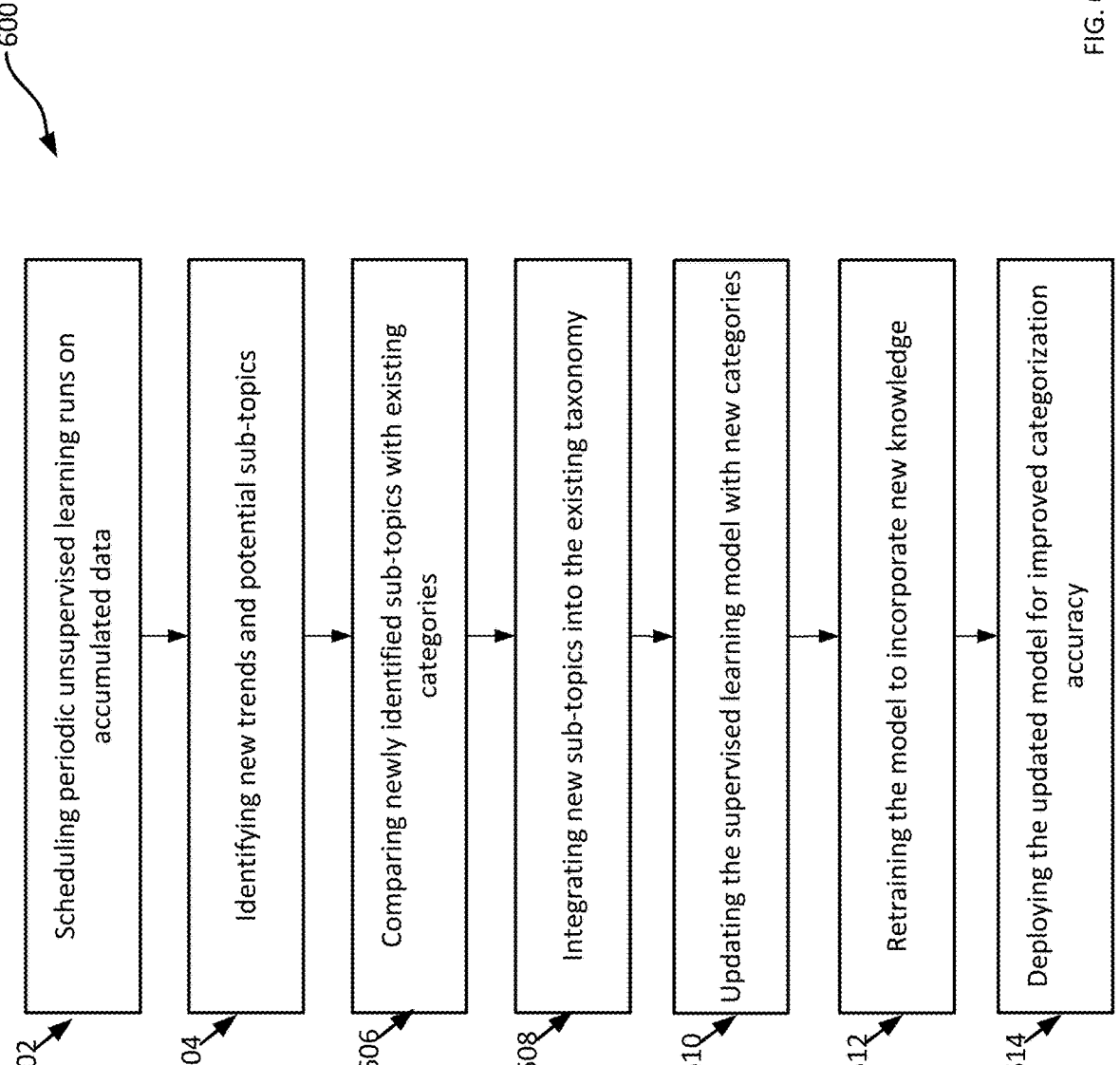

600

602 Scheduling periodic unsupervised learning runs on accumulated data

604 Identifying new trends and potential sub-topics

606 Comparing newly identified sub-topics with existing categories

608 Integrating new sub-topics into the existing taxonomy

610 Updating the supervised learning model with new categories

612 Retraining the model to incorporate new knowledge

614 Deploying the updated model for improved categorization accuracy

FIG. 6

AUTOMATED SUPPORT SUB-TOPIC CLASSIFICATION USING LARGE LANGUAGE MODELS

BACKGROUND

Customer support systems have evolved in recent years, leveraging advanced technologies to improve efficiency and user experience. Large language models (LLMs) have emerged as powerful tools for natural language processing, enabling more sophisticated analysis and understanding of customer queries.

However, existing customer support systems often struggle with accurately classifying complex or nuanced queries into specific sub-topics. Many systems rely on predefined taxonomies that may not adapt well to evolving customer needs or emerging issues. Additionally, the process of manually creating and maintaining these taxonomies can be time-consuming and prone to inconsistencies. Traditional classification methods fail to capture the full context and intent behind customer inquiries, leading to suboptimal routing and resolution of support tickets. As a result, there is a need for more advanced and adaptive approaches to customer support sub-topic classification that can improve accuracy, efficiency, and overall customer satisfaction.

SUMMARY

Embodiments disclosed herein solve the aforementioned technical problems and may provide other technical solutions as well. Contrary to conventional techniques, the disclosed solution includes a novel method and system for sub-topic classification using LLMs.

An example embodiment includes a method for automated support sub-topic classification comprising collecting user transcripts and LLM generated summaries of the transcripts, performing unsupervised learning to identify common themes in transcripts and summaries, generating sub-topics based on the identified common themes, creating labeled datasets by pairing the transcripts with LLM generated summaries and the sub-topics, training a supervised learning model to perform categorization of the user transcripts into the sub-topics, performing by the trained model real-time categorization of a new user query into the sub-topics, and generating an action response to the new user query based on the categorization.

An example embodiment includes a system for automated support sub-topic classification comprising a processor, and a memory storing instructions that when executed by the processor cause the system to collect by a data collection module user transcripts and LLM generated summaries of the transcripts, perform by an unsupervised learning module unsupervised learning to identify common themes in transcripts and summaries, generate by a sub-topic generation module sub-topics based on the identified common themes, create by a dataset creation module labeled datasets by pairing the transcripts with LLM generated summaries and the sub-topics, train by a model training module a supervised learning model to perform categorization of the user transcripts into the sub-topics, perform by the trained model real-time categorization of a new user query into the sub-topics, and generate by an action response module an action response to the new user query based on the categorization.

BRIEF DESCRIPTION OF THE DRAWINGS

So that the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may apply to other equally effective example embodiments.

FIG. 3 illustrates a flowchart for a method of automated support sub-topic classification using large language models, according to aspects of the present disclosure.

FIG. 4 illustrates a flowchart of a method for unsupervised learning and sub-topic identification in customer support data, according to aspects of the present disclosure.

FIG. 5 illustrates a flowchart for a method of training and deploying a supervised learning model for automated support sub-topic classification, according to aspects of the present disclosure.

FIG. 6 illustrates a flowchart for a continuous adaptation method for automated support sub-topic classification, according to aspects of the present disclosure.

DETAILED DESCRIPTION OF SEVERAL EMBODIMENTS

Figure 1:
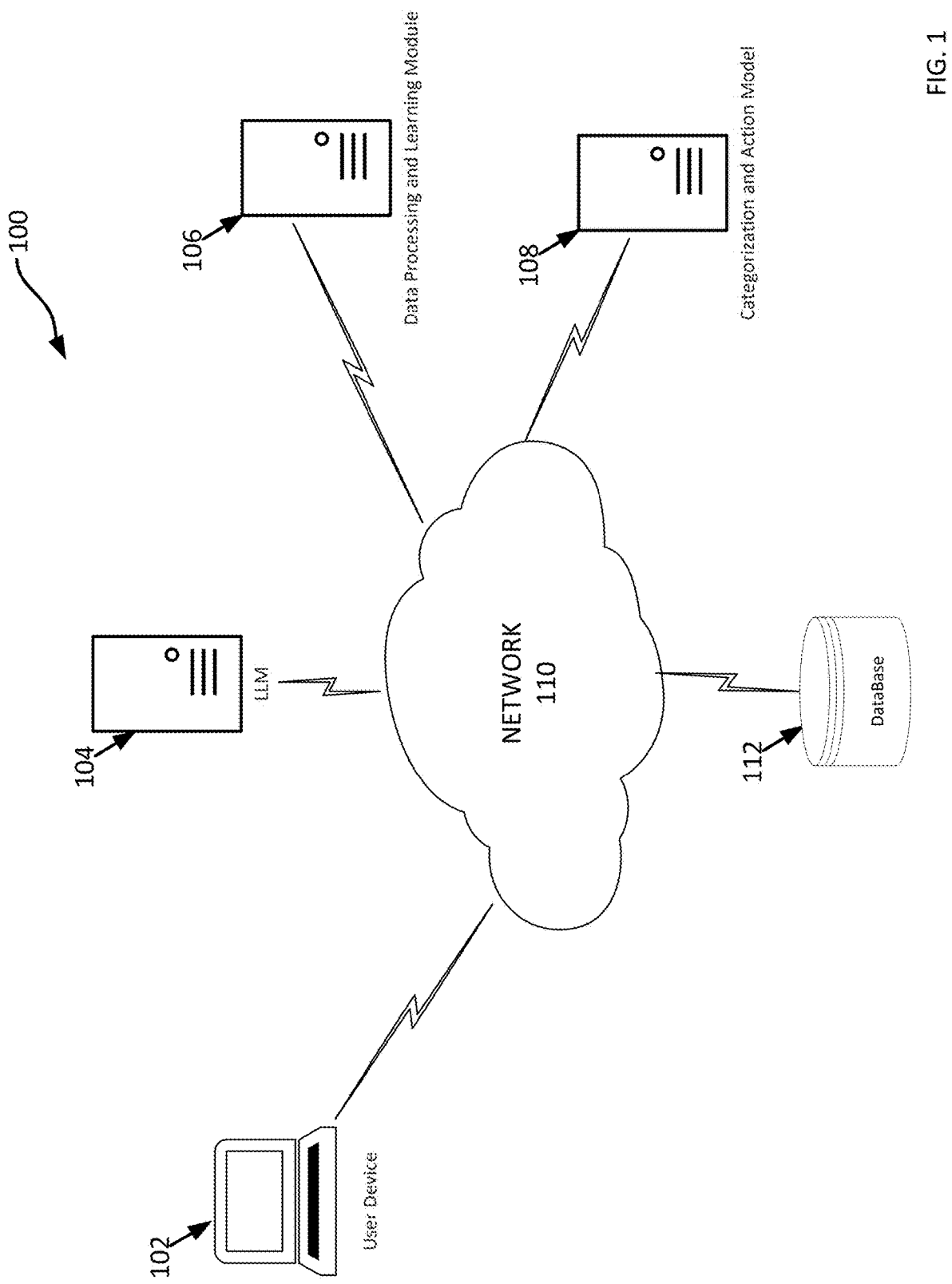
FIG. 1 illustrates a block diagram of an automated support sub-topic classification system, according to aspects of the present disclosure.

The present disclosure is directed to an automated support sub-topic classification system using LLMs that provides a sophisticated solution for efficiently categorizing and addressing customer support inquiries. This innovative system leverages the power of advanced natural language processing techniques to analyze, categorize, and respond to customer queries in real-time, without the need for extensive manual intervention and/or without predefined classification taxonomies.

By combining unsupervised and supervised learning approaches, the system can identify emerging trends in customer support issues and adapt its categorization capabilities accordingly. This dynamic approach allows for more accurate and granular classification of support topics, enabling businesses to provide faster, more relevant responses to customer inquiries.

One of the benefits of this system is its ability to operate in real-time during customer interactions. As a conversation unfolds, the system continuously analyzes and categorizes the dialogue, allowing for immediate adjustments in response strategies. This real-time capability enhances the customer experience by providing more accurate and timely support.

Furthermore, the system's predictive capabilities enable businesses to anticipate potential customer issues before they arise. By analyzing historical data and identifying patterns, the system can forecast likely support topics and prepare proactive solutions. This proactive approach can significantly reduce the volume of incoming support requests and improve overall customer satisfaction.

Another valuable feature of the system is its ability to automatically generate and update frequently-asked question (FAQ) entries based on frequently occurring sub-topics. As the system processes and categorizes customer inquiries, it identifies common themes and questions. This information is then used to create or update FAQ entries, ensuring that the knowledge base remains current and relevant to customer needs.

To illustrate the practical application of this system, consider a large e-commerce platform experiencing a surge in customer inquiries during a holiday sale. The automated support sub-topic classification system can rapidly process thousands of incoming queries, categorizing them into specific sub-topics such as "order tracking," "payment issues," or "product availability." As customers interact with the support system, their inquiries are analyzed in real-time, allowing for immediate routing to the appropriate support channel or automated response.

Simultaneously, the system may detect an emerging trend of customers experiencing difficulties with a newly launched mobile app feature. By identifying this pattern early, the e-commerce platform can proactively address the issue, perhaps by updating the FAQ section with troubleshooting steps or deploying a fix before the problem escalates. This predictive capability helps minimize customer frustration and reduces the overall volume of support requests.

Throughout this process, the system continuously refines its categorization model based on new data, ensuring that it remains effective even as customer needs and product offerings evolve. The automated generation and updating of FAQ entries further streamline the support process, providing customers with readily available answers to common questions and reducing the workload on human support agents.

By leveraging this advanced automated support sub-topic classification system, businesses can significantly enhance their customer support operations, leading to improved efficiency, reduced response times, and higher levels of customer satisfaction.

The automated support sub-topic classification system may provide an efficient and adaptive solution for categorizing and responding to customer support inquiries. The system may leverage LLMs and machine learning techniques to process, analyze, and categorize customer support interactions without manual intervention. From a technical standpoint, the system features improvements such as operability without predefined taxonomies and the ability to adjust categorization strategies and/or specifications in real time during deployment. This approach may enable organizations to handle a high volume of support requests more effectively, reduce response times, and improve overall customer satisfaction.

FIG. 1 illustrates a block diagram of an automated support sub-topic classification system 100. The system 100 may comprise a user device 102, an LLM 104, a processing and learning module 106, a categorization and action module 108, a network 110, and a database 112.

A user device 102 may be used to input customer support queries or interactions. The user device 102 may be a computer, smartphone, tablet, or any other device capable of sending and receiving data over the network 110. For example, a customer may use the user device 102 to submit a support ticket describing an issue with a software application.

The LLM 104 may be a server or computing device that hosts an LLM used for processing and analyzing customer support data. The LLM 104 may generate concise summaries of customer interactions, capturing core intents and details. For instance, if a customer submits a lengthy description of a problem, the LLM 104 may distill this information into a concise summary highlighting the main issue and relevant context.

The processing and learning module 106 may be responsible for preprocessing customer support transcripts and performing unsupervised learning to identify common themes and patterns in the data. This module may include an unsupervised learning component that analyzes the preprocessed data to discover recurring topics or issues without predefined categories. The processing and learning module 106 may also perform consistency validation by repeating the sub-topic identification process multiple times to ensure reliable results and reduce hallucinations.

The categorization and action module 108 may utilize the processed data to categorize customer queries into specific sub-topics and determine appropriate actions or responses. This module may include a supervised learning model trained on labeled datasets created by pairing transcripts with summaries and sub-topics. The categorization and action module 108 may provide AI-powered support suggestions to human agents in real-time, helping them respond more effectively to customer inquiries.

The network 110 may facilitate communication and data transfer between all components of the system 100. The network 110 may be a local area network (LAN), wide area network (WAN), the internet, or any combination thereof.

The database 112 may store customer support transcripts, LLM-generated summaries, and other relevant data used by the system for analysis and categorization. This centralized storage may allow for efficient retrieval and processing of historical data to improve the system's performance over time.

In a specific use case, the system 100 may be employed by a software company to handle customer support for their products. When a customer submits a support ticket through the user device 102, the system 100 may process the inquiry as follows: The LLM 104 may generate a concise summary of the customer's issue. The processing and learning module 106 may analyze the summary and original ticket to identify common themes and potential sub-topics. The categorization and action module 108 may classify the ticket into a specific sub-topic and suggest an appropriate action. Based on the classification, the system 100 may automatically route the inquiry to the appropriate support team. The system 100 may provide AI-powered suggestions to the support agent, helping them respond more effectively to the customer's issue.

Throughout this process, the system 100 may continuously learn and adapt, identifying trending problems that may require product updates or fixes. This proactive approach may help the software company address common issues more efficiently and improve their products based on customer feedback.

Figure 2:
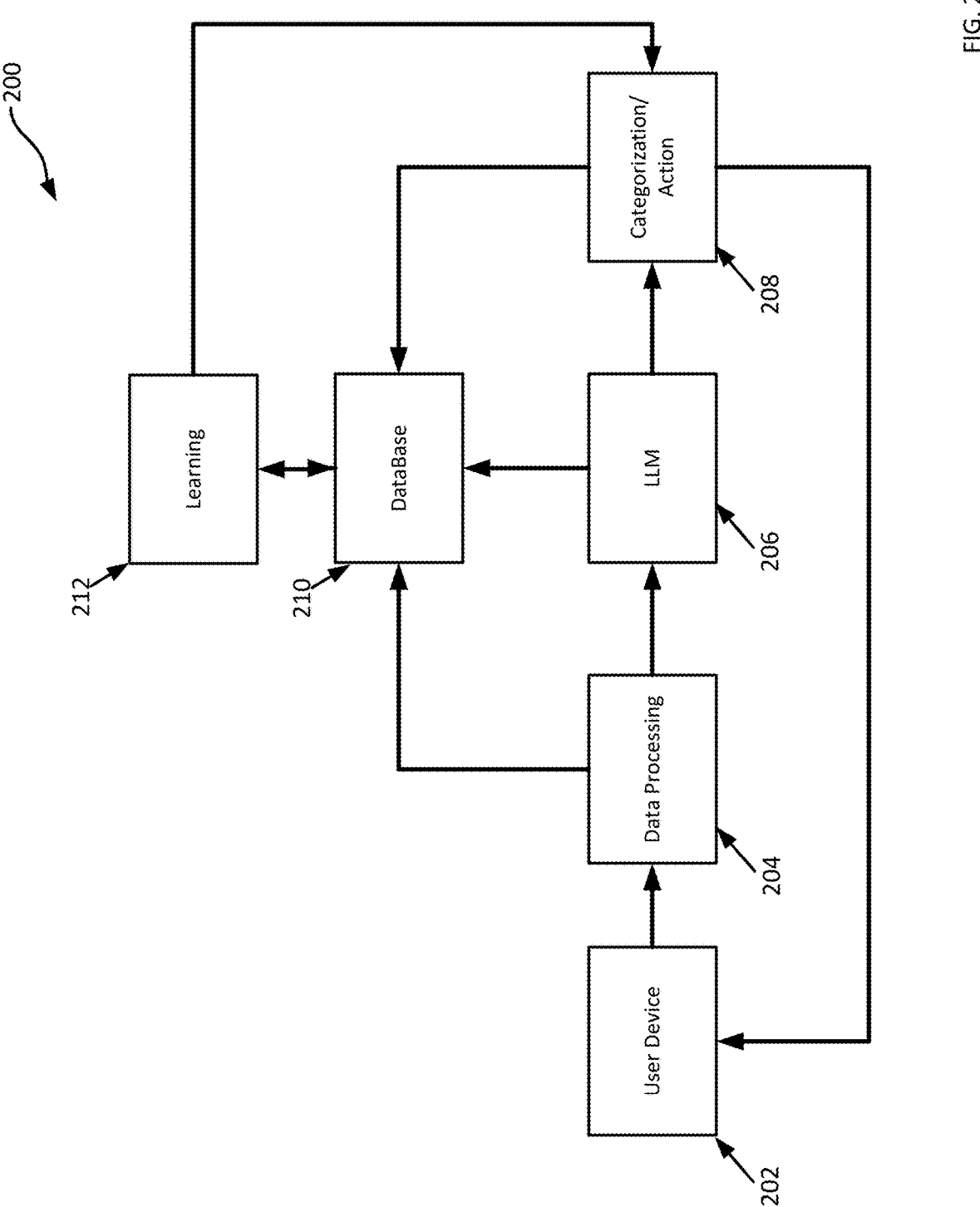
FIG. 2 illustrates another block diagram of an automated support sub-topic classification system, according to aspects of the present disclosure.

The automated support sub-topic classification system 200 shown in FIG. 2 may provide a comprehensive architecture for processing and categorizing customer support queries. The system 200 may comprise several interconnected modules, each serving a specific function in the classification process.

A user device 202 may serve as the interface for users to input queries or support requests. The user device 202 may be connected to a data processing module 204, which may preprocess the incoming data from the user device 202. In some cases, the data processing module 204 may include a text normalization module for normalizing text in user transcripts. The text normalization module may standardize the format of incoming text, removing inconsistencies and preparing the data for further processing.

After preprocessing, the data may be sent to an LLM 206. The LLM 206 may utilize LLMs to analyze and interpret the preprocessed data. In some cases, the LLM 206 may tokenize user transcripts before generating summaries. Tokenization may involve breaking down the text into individual words or subwords, which may allow for more effective processing by the language model.

The output from the LLM 206 may be forwarded to a categorization module 208, which may classify the processed information into appropriate sub-topics or categories. The categorization module 208 may include a feature extraction module for extracting features from the new user query. These extracted features may be used to determine the appropriate category for the query.

The system 200 may also include a database 210, which may be connected to the data processing module 204, the LLM 206, and the categorization module 208. The database 210 may store relevant information and data used by these modules during their operations. This may include historical query data, pre-defined response templates, and learned categorization patterns.

A learning module 212 may be connected to both the database 210 and the categorization module 208. The learning module 212 may continuously update and refine the system's categorization capabilities based on new data and outcomes. In some cases, the learning module 212 or the LLM 206 may include an unsupervised learning module that applies a clustering algorithm to identify groups of similar content in the processed data.

The categorization module 208 may also be connected back to the user device 202, allowing for the delivery of categorized responses or actions based on the processed query. In some cases, the categorization module 208 may include a sub-topic generation module that analyzes identified common themes, groups related themes, and assigns descriptive labels to each group of related themes.

An action response module may be part of the categorization module 208 or may exist as a separate component within the system 200. The action response module may retrieve pre-defined action responses associated with the assigned sub-topic category. The action response module may then select an appropriate action response based on the content of the new user query and customize the selected action response to address the specific details of the query.

In a practical application, the system 200 may be used by a tax preparation software company to handle customer support inquiries. When a customer submits a query about a tax filing issue through the user device 202, the data processing module 204 may normalize the text and remove any personally identifiable information. The LLM 206 may then analyze the preprocessed query, generating a summary and extracting beneficial information.

The categorization module 208 may use this processed information to classify the query as a "tax deduction" sub-topic. The action response module may then retrieve pre-defined responses related to tax deductions, select the appropriate one based on the specific details of the customer's query, and customize the selected response to address the customer's particular situation.

Throughout this process, the learning module 212 may analyze the interaction, updating its understanding of tax-related queries and refining its categorization algorithms. This continuous learning process may allow the system 200 to adapt to new types of tax inquiries and improve its performance over time.

FIG. 3 illustrates a flowchart for a method 300 of automated support sub-topic classification using LLMs. The method 300 may provide a systematic approach to processing and categorizing customer support inquiries, enabling more efficient and accurate responses to user queries.

The method 300 may begin with receiving user queries through various channels at 302. These channels may include email, chat, phone calls, or social media platforms. For example, a customer may submit a query about a malfunctioning software feature through a company's online support portal. The user device 102 may transmit this query to the system 100 via the network 110.

System 100 may process the incoming user queries at 304 to create user transcripts and LLM generated summaries of the user transcripts. In some cases, this process may be initiated when a user submits a query through the user device 102. The query may be received by the system 100 through the network 110 and routed to the processing and learning module 106. The processing and learning module 106 may then preprocess the query by removing any personally identifiable information and normalizing the text. The preprocessed query may then be sent to the LLM 104, which may analyze the raw text and generate a concise summary capturing the beneficial information. For instance, if a customer submits a lengthy email describing multiple issues with a product, the LLM 104 may distill this information into a brief summary highlighting the beneficial points and main concerns. The original query, preprocessed text, and LLM-generated summary may then be stored in the database 112 for further processing and analysis.

System 100 may employ various natural language processing techniques to create user transcripts and generate LLM summaries. For instance, the system may use speech-to-text algorithms to convert voice recordings from phone calls into text transcripts. The LLM model may then apply techniques such as text segmentation to break down long emails into coherent sections, and use extractive summarization methods to identify beneficial sentences. For chat interactions, the system may employ dialogue act classification to understand the intent behind each message. The LLM may utilize abstractive summarization techniques, leveraging models like Bidirectional and Auto-Regressive Transformers (BART) or T5, to generate concise summaries that capture the essence of the user's query. In cases of multilingual support, the system may incorporate machine translation models to convert queries into a standard language before summarization. The LLM may use named entity recognition to identify and extract beneficial details such as product names, error codes, or specific features mentioned in the query.

System 100 may perform unsupervised learning at 306 to identify common themes in the user transcripts and LLM generated summaries. The processing and learning module 106 or LLM 104 may employ clustering algorithms or topic modeling techniques to discover recurring patterns or issues within the data. This processing may not rely on predefined categories, allowing the system 100 to adapt to emerging trends in customer inquiries.

At 306, the processing and learning module 106 may employ various unsupervised learning techniques to identify common themes in the user transcripts and LLM generated summaries. For example, the module may utilize latent Dirichlet allocation (LDA) to discover abstract topics within the text data or apply k-means clustering to group similar queries based on their vector representations. The system may implement hierarchical clustering algorithms, such as agglomerative clustering, to create a tree-like structure of themes and sub-themes. In some cases, the module may use non-negative matrix factorization (NMF) to decompose the text data into semantic components, revealing underlying patterns. The system may employ word embedding techniques like Word2Vec or GloVe to capture semantic relationships between words, which can then be used in conjunction with density-based clustering algorithms like DBSCAN to identify themes based on word similarity. The module may utilize dimensionality reduction techniques such as t-SNE or UMAP to visualize and explore high-dimensional text data, potentially revealing clusters or themes that may not be apparent through other methods.

For example, the unsupervised learning process may reveal that a significant number of recent queries relate to difficulties with a newly released software update. By identifying this theme without manual intervention, the system 100 may quickly adapt to address this emerging issue.

System 100 may generate sub-topics based on the identified common themes at 308. The processing and learning module 106 or LLM 104 may analyze the clusters or topics discovered as described above and create more specific sub-categories. These sub-topics may provide a finer granularity of classification for customer inquiries.

For instance, if a common theme of "payment issues" is identified, the system 100 may generate sub-topics such as "credit card declined," "incorrect billing amount," or "subscription renewal problems." This detailed categorization may enable more targeted and efficient responses to customer queries.

At 308, the processing and learning module 106 may employ various techniques to generate sub-topics from the identified common themes. The module may utilize hierarchical clustering algorithms to create a tree-like structure of themes and sub-themes, allowing for multi-level categorization. In some cases, the system may apply natural language processing techniques such as named entity recognition and keyword extraction to identify specific attributes or entities within each theme, which may serve as the basis for sub-topics. The module may use semantic similarity measures, such as cosine similarity or Jaccard similarity, to group closely related themes into coherent sub-topics. The system may leverage pre-trained language models to generate descriptive labels for each sub-topic, ensuring that the categorization is both accurate and human-readable. The sub-topic generation process may be iterative, with the system refining and adjusting the sub-topics based on their coherence and distinctiveness. In some implementations, the module may employ a combination of rule-based and machine learning approaches to balance domain-specific knowledge with data-driven insights when creating sub-topics.

System 100 may create labeled datasets at 310 by pairing the transcripts with LLM generated summaries and the sub-topics. The processing and learning module 106 may associate each user transcript and its corresponding LLM-generated summary with the relevant sub-topic. These labeled datasets may serve as training data for subsequent supervised learning.

For example, a user transcript about a failed attempt to update software may be paired with its LLM-generated summary and labeled with the sub-topic "software update errors." This process may create a structured dataset that links raw customer inquiries to concise summaries and specific sub-topics.

At 310, the processing and learning module 106 may employ various techniques to create labeled datasets. For instance, the module may use cosine similarity measures to match user transcripts and LLM-generated summaries with the semantically similar sub-topics. The system may utilize a pre-trained BERT model fine-tuned on domain-specific data to perform multi-label classification, assigning multiple relevant sub-topics to each transcript-summary pair. In some cases, the module may implement a hierarchical attention network (HAN) to capture the importance of different parts of the transcript and summary when assigning sub-topics. The system may employ active learning techniques, where uncertain classifications are flagged for human review, gradually improving the labeling accuracy over time. The module may use data augmentation techniques such as back-translation or synonym replacement to expand the labeled dataset, potentially improving the robustness of subsequent supervised learning models. The labeled datasets may be stored in a structured format, such as JavaScript object notation (JSON) or parquet files, with each entry containing the original transcript, the LLM-generated summary, and an array of assigned sub-topic labels along with their confidence scores.

At 312, system 100 may train a supervised learning model to perform categorization of the user transcripts into the sub-topics. The categorization and action module 108 may use the labeled datasets to train a machine learning model, such as a neural network or a support vector machine, to automatically classify new inquiries into the appropriate sub-topics.

The training process may involve feeding the labeled datasets into the model, adjusting the model's parameters based on the accuracy of its predictions, and iterating this process until the model achieves a satisfactory level of performance. For instance, the model may learn to associate keywords or patterns in the text with specific sub-topics, enabling it to categorize new queries accurately.

At 312, the categorization and action module 108 may employ various supervised learning techniques to train the model for sub-topic classification. For instance, the module may utilize a deep neural network architecture such as a Bidirectional Long Short-Term Memory (BiLSTM) network with attention mechanisms to capture contextual information from the user transcripts and LLM-generated summaries. Alternatively, the system may implement a transformer-based model like bidirectional encoder representations from transformers (BERT) or robust optimized BERT approach (ROBERTa), fine-tuned on the labeled datasets to leverage pre-trained language understanding capabilities. The training process may involve techniques such as transfer learning, where a pre-trained model is adapted to the specific domain of customer support queries. The module may experiment with ensemble methods, combining multiple models such as gradient boosting classifiers (e.g., xtreme gradient boosting (XGBoost) or light gradient boosting machine (LightGBM)) with neural networks to improve classification accuracy. To handle imbalanced datasets, where some sub-topics may have fewer examples, the system may apply techniques like oversampling, undersampling, or synthetic data generation using methods such as Synthetic Minority Over-sampling Technique (SMOTE). The training process may utilize techniques like k-fold cross-validation to ensure robust performance across different subsets of the data, and may employ early stopping and learning rate scheduling to prevent overfitting and optimize convergence.

System 100 may use the trained model at 314 to perform real-time categorization of future queries. When a new user query is received, the categorization and action module 108 may process the query through the trained model to assign the query to the relevant sub-topic. This real-time categorization may enable swift and appropriate responses to customer inquiries.

For example, if a customer submits a query about difficulty logging into their account, the trained model may quickly categorize this as a "login issues" sub-topic, allowing the system 100 to provide relevant troubleshooting steps or route the query to the appropriate support team.

At 314, the trained model may employ various techniques for real-time categorization of new user queries. For instance, the system may use feature extraction methods such as term frequency-inverse document frequency (TF-IDF) or word embeddings to convert the incoming text into a numerical representation suitable for the model. The categorization module may then apply the trained classifier, which could be a neural network, support vector machine, or ensemble model, to predict the relevant sub-topic. In some cases, the system may utilize a hierarchical classification approach, first determining the broad category before refining the prediction to a specific sub-topic. The model may output confidence scores for multiple sub-topics, allowing for multi-label classification when a query spans multiple issues. To handle real-time processing of high query volumes, the system may implement techniques like model quantization or pruning to reduce inference time while maintaining accuracy. The categorization module may employ caching mechanisms to store recent classification results, enabling faster responses for similar queries. The system may integrate online learning capabilities, allowing the model to adapt to slight shifts in query patterns without full retraining.

At 316, system 100 may generate an action response to the new user query based on the categorization. The categorization and action module 108 may use the assigned sub-topic to determine the appropriate course of action for addressing the user's inquiry.

This action response may include providing an automated answer, routing the query to a specific support agent, escalating the issue to a higher tier of support, and/or requesting additional information from the user. For instance, if a query is categorized under the "product return" sub-topic, the system 100 may automatically generate a response with instructions for initiating a return process and provide a link to the relevant online form.

At 316, the system may generate action responses tailored to the categorized sub-topic. For example, if a query is classified under the "software installation error" sub-topic, the system may automatically generate a response with step-by-step troubleshooting instructions, including commands to clear cache, verify system requirements, or run diagnostic tools. For a "billing discrepancy" sub-topic, the action response may include a breakdown of recent charges, links to relevant invoice documents, and options for disputing charges or requesting a refund. In the case of a "product compatibility" query, the system may generate a response containing a compatibility matrix, links to firmware update guides, or suggestions for alternative products. For a "data migration" sub-topic, the action response may include a detailed migration checklist, links to backup tutorials, and precautionary measures to prevent data loss. If a query falls under the "account security" sub-topic, the system may trigger a multi-step verification process, provide instructions for enabling two-factor authentication, or initiate a password reset procedure with a time-sensitive security token. The system may incorporate dynamic content insertion, pulling real-time information such as current wait times for live support or the status of ongoing service outages, to enhance the relevance and timeliness of the generated action responses.

In a tax software preparation use case, the method 300 may begin at 302, where a user submits a query about a specific tax deduction through the software's customer support portal. The system may receive this query and process it at 304, creating a transcript of the user's question and generating an LLM summary that captures the beneficial points about the tax deduction inquiry. At 306, the system may perform unsupervised learning on this and other recent queries, potentially identifying a common theme of users asking about new tax laws affecting deductions. At 308, the system may generate sub-topics based on this theme, such as "home office deductions," "charitable contributions," and "medical expense deductions."

In this use case, at 310, the system may create labeled datasets by pairing the user's transcript and LLM summary with the appropriate sub-topic, in this case, "home office deductions." At 312, the system may train a supervised learning model using these labeled datasets, enabling it to recognize patterns in queries related to various tax deductions. At 314, system 100 may use the trained model to categorize new user queries in real-time, such as quickly identifying a new question about home office furniture as belonging to the "home office deductions" sub-topic. At 316, the system may generate an action response based on this categorization, potentially providing the user with specific information about IRS guidelines for home office deductions or routing the query to a tax specialist familiar with this area of tax law.

FIG. 4 illustrates a flowchart of a method 400 for unsupervised learning and sub-topic identification in customer support data. The method 400 may be implemented by the processing and learning module 106 and the learning module 212 of the systems 100 and 200, respectively.

At 402, system 100 may collect preprocessed user transcripts and LLM-generated summaries. The data processing module 204 may preprocess the user transcripts by removing personally identifiable information (PII) and normalizing the text. The LLM 206 may generate concise summaries of the preprocessed transcripts, capturing the core intent and beneficial details of each customer interaction. In some cases, the LLM 206 may be prompted with specific instructions to focus on certain aspects of the interaction, such as the main issue, any attempted solutions, or the customer's emotional state. The prompts may be customized based on the type of query or the specific needs of the support team. For example, the LLM 206 may be instructed to "Summarize the customer's primary concern and any troubleshooting steps already taken" or "Identify the product features mentioned and any expressed dissatisfaction." These targeted prompts may help generate more relevant and actionable summaries for the support agents.

In some cases, the learning module 212 may utilize both the original preprocessed transcripts and the LLM-generated summaries for unsupervised learning. This dual-input approach may allow for a more comprehensive analysis, capturing both the detailed context from the original transcripts and the distilled beneficial points from the summaries.

At 404, system 100 may analyze the collected inputs using unsupervised learning algorithms. The learning module 212 or the LLM 206 may apply a clustering algorithm to perform unsupervised learning on the preprocessed transcripts and LLM-generated summaries. This clustering algorithm may group similar content together based on semantic similarities and recurring patterns.

For example, the clustering algorithm may identify groups of customer interactions related to specific product features, common issues, or types of inquiries. The algorithm may consider factors such as word frequency, phrase patterns, and contextual relationships to determine the similarity between different customer interactions.

At 406, system 100 may identify common themes and patterns in the data. The learning module 212 or the LLM 206 may analyze the clusters formed in step 404 to extract prevalent themes and recurring patterns across the customer support interactions.

This analysis may involve techniques such as topic modeling, which can uncover latent themes in the data, or frequent pattern mining, which can identify commonly occurring sequences of words or phrases. For instance, the learning module 212 may identify themes such as "login issues," "billing inquiries," or "product feature requests" based on the frequency and co-occurrence of terms and concepts in the clustered data.

At 408, system 100 may generate a list of potential sub-topics according to the common themes discovered. The learning module 212 may create a comprehensive list of sub-topics that represent the main categories of customer inquiries and issues identified through the unsupervised learning process. The learning module 212 may employ various techniques to generate the list of potential sub-topics. For instance, the module may utilize hierarchical clustering algorithms to create a tree-like structure of themes, allowing for the identification of both broad categories and more specific sub-topics. The system may apply natural language processing techniques such as named entity recognition and keyword extraction to identify specific attributes or entities within each theme, which may serve as the basis for sub-topics. In some cases, the module may use semantic similarity measures, such as cosine similarity or Jaccard similarity, to group closely related themes into coherent sub-topics. The system may leverage pre-trained language models to generate descriptive labels for each sub-topic, ensuring that the categorization is both accurate and human-readable. The sub-topic generation process may be iterative, with the system refining and adjusting the sub-topics based on their coherence and distinctiveness. In some implementations, the module may employ a combination of rule-based and machine learning approaches to balance domain-specific knowledge with data-driven insights when creating sub-topics.

Each potential sub-topic may be associated with a set of related terms, phrases, and example interactions that characterize the sub-topic. For example, a "password reset" sub-topic may be associated with terms like "forgot password," "can't log in," and "account access," along with example interactions where customers requested assistance with resetting their passwords.

At 410, system 100 may validate the generated sub-topics through iterative consistency checks. The learning module 212 may perform multiple iterations of the sub-topic generation process to ensure consistency and reliability in the identified sub-topics.

This validation process may involve techniques such as cross-validation, where the learning module 212 applies the sub-topic identification process to different subsets of the data and compares the results for consistency. The learning module 212 or the LLM 206 may also employ ensemble methods, combining the results of multiple clustering algorithms to improve the robustness of the identified sub-topics.

At 412, system 100 may refine and finalize the list of sub-topics based on the validation results. The learning module 212 may analyze the results of the iterative consistency checks to identify the stable and representative sub-topics.

During this refinement process, the learning module 212 may merge similar sub-topics, eliminate outliers or infrequent sub-topics, and adjust the boundaries between related sub-topics. For example, if the validation process consistently identifies separate sub-topics for "mobile app login issues" and "website login issues," the learning module 212 may combine these into a single "login issues" sub-topic with mobile and website as subcategories. The learning module 212 may recognize and combine sub-topics by analyzing semantic similarities, co-occurrence patterns, and hierarchical relationships between identified themes. It may utilize techniques such as clustering algorithms, similarity metrics, and natural language processing to identify overlapping or closely related sub-topics, and then merge them based on predefined thresholds or rules, creating a more coherent and streamlined categorization structure.

At 414, system 100 may store the identified sub-topics along with their corresponding transcripts and LLM summaries as labeled datasets. The learning module 212 may save this information in the database 210 for use in subsequent supervised learning and categorization tasks.

These labeled datasets may serve as training data for the supervised learning model, enabling the system to categorize future customer inquiries into the identified sub-topics. Each entry in the labeled dataset may include the original preprocessed transcript, the LLM-generated summary, and the assigned sub-topic label. This comprehensive dataset may allow for more accurate and context-aware categorization in future customer support interactions.

The methods may use various algorithms to achieve their goal. For example, at 402, the system may employ natural language processing techniques such as tokenization, stemming, and named entity recognition to preprocess the user transcripts. The LLM-generated summaries may be created using abstractive summarization models like BART or T5. At 404, the system may utilize clustering algorithms such as K-means, density based spatial clustering of applications with noise (DBSCAN), or hierarchical clustering to group similar content. At 406, the system may apply topic modeling techniques like Latent Dirichlet Allocation (LDA) or Non-negative Matrix Factorization (NMF) to identify common themes. At 408, the system may use word embedding models like Word2Vec or GloVe to generate semantically related terms for each potential sub-topic. At 410, the system may use techniques such as bootstrap aggregating (bagging) or cross-validation to ensure consistency in sub-topic identification. At 412, the system may apply similarity measures like cosine similarity or Jaccard index to merge or separate sub-topics. At 414, the system may store the labeled datasets in a structured format like JSON or parquet files for efficient retrieval and processing.

In the tax software preparation use case, processing at 402 may involve collecting preprocessed user transcripts about tax deductions, removing any personal financial information, and generating concise summaries that capture the beneficial points of each inquiry. For example, a user's lengthy question about home office deductions may be summarized to "Inquiry about eligibility and calculation of home office deductions for remote work." At 404, the system may then analyze these preprocessed transcripts and summaries, grouping similar tax-related queries together. This may result in clusters of queries related to various types of deductions, such as home office, charitable contributions, and medical expenses.

In the use case, at 406, the system may identify common themes within these clusters, such as "confusion about new tax laws" or "questions about documentation requirements for deductions." At 408, the system may generate a list of potential sub-topics based on these themes, such as "home office deduction eligibility," "charitable contribution limits," and "medical expense thresholds." At 410, the system may validate these sub-topics by repeatedly applying the identification process to different subsets of tax-related queries, ensuring consistent results. At 412, the system may then refine the sub-topics, potentially merging closely related categories or creating hierarchical relationships, such as grouping "home office furniture" and "home office utilities" under a broader "home office deductions" category. At 414, the system may store these refined sub-topics along with their corresponding tax-related transcripts and summaries as labeled datasets, creating a comprehensive training set for the tax software's support system to categorize future user inquiries about deductions.

FIG. 5 illustrates a flowchart for a method 500 of training and deploying a supervised learning model for automated support sub-topic classification. The method 500 may provide a systematic approach to developing and maintaining an effective categorization model, enabling more accurate and efficient responses to customer support inquiries.

The method 500 may begin at 502, where system 100 may retrieve labeled datasets. These datasets may include preprocessed user transcripts and LLM-generated summaries paired with corresponding sub-topic categories. The labeled datasets may serve as the foundation for training the supervised learning model, providing examples of correctly categorized customer support interactions. For instance, the datasets may contain thousands of historical customer queries, each associated with a specific sub-topic such as "billing issues," "product returns," or "technical support."

At 504, system 100 may preprocess and prepare the labeled data for training. This preprocessing may involve cleaning the data, normalizing text, and formatting the normalized text appropriately for the supervised learning model. The data processing module 204 may perform tasks such as removing irrelevant information, standardizing text formats, and encoding categorical variables. For example, the module may convert all text to lowercase, remove special characters, and replace product names with generic identifiers to prevent the model from overfitting to specific product mentions.

At 506, system 100 may train the supervised learning model to predict categories based on the transcripts and corresponding LLM summaries. The learning module 212 may apply various machine learning algorithms, such as support vector machines, random forests, or neural networks, to learn the patterns and features that distinguish different sub-topics. During this process, the model may learn to associate specific keywords, phrases, or semantic structures with particular sub-topics.

For instance, the model may learn that phrases like "unable to log in" or "forgot password" are strongly associated with the "account access issues" sub-topic. The training process may involve multiple iterations, with the model's parameters being adjusted to minimize classification errors on the training data.

The method 500 may then proceed to 508, where system 100 may validate the model's performance using a portion of the labeled dataset that was set aside for testing. This validation may help assess the model's accuracy and generalization capabilities. The learning module 212 may use metrics such as precision, recall, and F1 score to evaluate the model's performance across different sub-topics.

For example, the module may calculate the percentage of correctly classified queries for each sub-topic and identify any categories where the model consistently underperforms. This information may be beneficial for understanding the model's strengths and weaknesses, and for guiding further improvements.

At 510, system 100 may fine tune the model based on the performance metrics obtained from the validation step. This fine-tuning process may involve adjusting hyperparameters, modifying the model architecture, or incorporating additional features to improve its predictive capabilities. The learning module 212 may use techniques such as cross-validation or grid search to systematically explore different model configurations and identify the optimal settings.

For instance, if the model shows poor performance in distinguishing between closely related sub-topics, the module may experiment with increasing the model's complexity or incorporating more contextual features from the LLM-generated summaries.

At 512, system 100 may deploy the trained model for real-time categorization of new queries. At this stage, the model may be integrated into the categorization module 208, ready to process incoming customer support interactions and classify them into appropriate sub-topics. The deployment process may include setting up the infrastructure to handle real-time requests, such as API endpoints or message queues.

For example, when a customer submits a new support ticket through the user device 202, the system 200 may preprocess the query, generate an LLM summary, and then use the deployed model to quickly assign it to the relevant sub-topic. This real-time categorization may enable swift routing of the query to the appropriate support team or the generation of an automated response.

At 514, system 100 may perform continuous monitoring of the model's performance. This ongoing process may help identify any degradation in accuracy over time and inform decisions about when to retrain or update the model. The learning module 212 may track metrics such as classification accuracy, response times, and user feedback to assess the model's effectiveness in real-world scenarios.

For instance, the module may generate weekly reports showing the distribution of queries across different sub-topics, highlighting any unexpected shifts in categorization patterns. If the system 200 detects a significant drop in accuracy for sub-topics, it may trigger an alert for manual review or initiate an automated retraining process using the recently labeled data.

The methods may use various algorithms to achieve their goal. For example, at 502, the system may utilize distributed storage to efficiently retrieve large volumes of labeled datasets. At 504, the system may employ advanced text preprocessing techniques such as TF-IDF vectorization or word embeddings to convert text data into numerical features. At 506, the system may use ensemble learning methods like XGBoost or deep learning architectures such as BERT for training the supervised model. At 508, the system may use k-fold cross-validation and confusion matrix analysis to thoroughly validate the model's performance. At 510, the system may utilize Bayesian optimization or genetic algorithms to fine-tune the model's hyperparameters. At 512, the system may leverage containerization technologies and orchestration platforms for seamless model deployment. At 514, the system may implement automated monitoring using tools to track model performance in real-time.

In the tax software use case, processing at 502 may involve retrieving labeled datasets containing historical tax-related queries, their LLM-generated summaries, and assigned sub-topics from the company's secure data warehouse. These datasets may include a wide range of tax-related inquiries, from simple questions about filing deadlines to complex scenarios involving multiple deductions and credits. At 504, the system may then preprocess this data by removing any remaining personally identifiable information, standardizing tax-specific terminology, and encoding categorical variables such as tax years or filing statuses. At 506, the system may train a supervised learning model, such as a gradient boosting classifier, to predict the appropriate sub-topic for each tax-related query based on the preprocessed text and LLM summary.

In the use case, at 508, the system may validate the model's performance using a held-out test set of tax queries, evaluating its ability to correctly categorize inquiries across various tax topics such as deductions, credits, and filing procedures. At 510, the system may fine-tune the model by adjusting parameters like the number of estimators or learning rate to improve its accuracy on challenging tax scenarios, such as distinguishing between closely related deduction categories. At 512, the system may deploy the trained model to the tax software's production environment, integrating it with the existing customer support infrastructure to provide real-time categorization of incoming tax-related queries. At 514, the system may continuously monitor the model's performance during tax season, tracking metrics such as the accuracy of tax advice categorization and user satisfaction with the automated responses, and triggering retraining if the model's performance drops below a threshold due to changes in tax laws or emerging tax-related issues.

FIG. 6 illustrates a flowchart for a continuous adaptation method 600 for automated support sub-topic classification. The method 600 may be implemented by the system 100 or the system 200 to ensure that the classification system remains effective and up-to-date as customer support trends evolve over time.

At 602, system 100 may schedule periodic unsupervised learning runs on accumulated data. The processing and learning module 106 or the learning module 212 may be configured to automatically initiate these runs at predetermined intervals, such as weekly or monthly. During these scheduled runs, the module may analyze a large corpus of recent customer support interactions stored in the database 112 or the database 210.

For example, if a software company implements this method, the system may analyze customer support tickets from the past month to identify any new patterns or trends in user inquiries. This regular analysis may help the system adapt to changes in product features, user behavior, or emerging issues that may not have been present when the system was initially trained.

At 604, system 100 may identify new trends and potential sub-topics based on the unsupervised learning results. The processing and learning module 106 or LLM 104 may apply clustering algorithms or topic modeling techniques to the analyzed data to discover emerging patterns that do not fit into existing sub-topic categories.

For instance, if the software company releases a new feature, the system may detect a cluster of related inquiries about this feature that do not match any existing sub-topics. The system may identify this as a potential new sub-topic, such as "New Feature X Usage Questions." This step may be beneficial for keeping the classification system relevant and responsive to evolving customer needs.

At 606, system 100 may compare the newly identified sub-topics with existing categories. The categorization and action module 108 or the categorization module 208 may evaluate the potential new sub-topics against the current taxonomy of support categories to determine if they are truly novel or if they are variations of existing categories.

This comparison process may involve semantic analysis to measure the similarity between new and existing sub-topics. For example, if a new cluster of inquiries is identified related to "mobile app login issues," the system may compare this to existing categories like "general login problems" to determine if the new cluster warrants a separate sub-topic or merging with an existing category.

At 608, system 100 may integrate new sub-topics into the existing taxonomy. If the comparison at 606 determines that a new sub-topic is sufficiently distinct from existing categories, the categorization and action module 108 or the categorization module 208 may add the new sub-topic to the classification system's taxonomy.

The integration process may involve creating new labels, defining characteristic features of the sub-topic, and establishing relationships with other related categories. For instance, if "mobile app login issues" is determined to be a distinct sub-topic, the system may create this new category, define its beneficial features (e.g., specific error messages or user interface elements unique to mobile login), and establish its relationship to the broader "login issues" category.

At 610, system 100 may update the supervised learning model with the new categories. Once new sub-topics have been integrated into the taxonomy, the categorization and action module 108 or the categorization module 208 may update the supervised learning model to recognize and classify future inquiries that fall under these new categories.

This update process may involve expanding the model's output layer to include the new categories and fine-tuning the model's parameters to accurately identify instances of the new sub-topics. For example, if "New Feature X Usage Questions" is added as a sub-topic, the model may be updated to recognize keywords, phrases, and patterns associated with inquiries about this new feature.

At 612, system 100 may retrain the model to incorporate the new knowledge. The categorization and action module 108 or the categorization module 208 may use the expanded dataset, which now includes examples of the new sub-topics, to retrain the supervised learning model.

The retraining process may involve techniques such as transfer learning, where the existing model's knowledge is preserved while new information is incorporated. This may allow the model to maintain its performance on existing categories while gaining the ability to accurately classify inquiries into the new sub-topics. For instance, the model may be retrained using a combination of historical data and new examples related to "New Feature X Usage Questions" to ensure it can effectively categorize both old and new types of inquiries.

At 614, system 100 may deploy the updated model for improved categorization accuracy. Once the model has been retrained and validated, the categorization and action module 108 or the categorization module 208 may deploy the updated model to handle live customer support interactions.

The deployment process may involve replacing the previous version of the model with the updated one in the production environment. This may ensure that all new customer inquiries are categorized using the up-to-date classification system. For example, when a customer submits a question about the new software feature through the user device 102 or the user device 202, the deployed model may now be able to accurately categorize it under "New Feature X Usage Questions" and provide appropriate responses or route it to the correct support team.

In some cases, the system may include a feedback analysis module for analyzing user feedback on generated action responses. This module may collect and analyze feedback from customers or support agents on the appropriateness and effectiveness of the system's categorizations and responses. For example, if a customer indicates that their inquiry was misclassified or that the provided solution was not helpful, this feedback may be recorded and analyzed.

The model training module may update the supervised learning model based on the feedback collected by the feedback analysis module. This continuous feedback loop may allow the system to fine-tune its performance over time, addressing any recurring misclassifications or ineffective responses. For instance, if multiple customers provide feedback that their "mobile app login issues" are being incorrectly classified as general login problems, the model may be adjusted to more accurately distinguish between these categories.

The system may also include a performance evaluation module for generating performance metrics for the categorization. This module may track various metrics such as classification accuracy, response relevance, and customer satisfaction scores for each sub-topic. These metrics may provide insights into the overall effectiveness of the classification system and highlight areas for improvement.

The performance evaluation module may identify sub-topics with low categorization accuracy. By analyzing the performance metrics, the module may flag categories where the system consistently underperforms. For example, if the "New Feature X Usage Questions" category has a significantly lower classification accuracy compared to other categories, it may be identified for further investigation and refinement.

The sub-topic generation module may refine the sub-topics and labeled datasets for sub-topics with low categorization accuracy. This refinement process may involve re-examining the characteristics of problematic sub-topics, adjusting their definitions, or collecting additional training examples to improve the model's performance. For instance, if the "mobile app login issues" sub-topic is frequently confused with other categories, the module may refine its definition, add more distinctive features, or gather more diverse examples to better represent the range of inquiries in this category.

By implementing this continuous adaptation process, the automated support sub-topic classification system may maintain its effectiveness over time, adapting to new trends, refining its categorization based on feedback, and continuously improving its performance across all sub-topics.

The methods may use various algorithms to achieve their goal. For example, at 602, the system may employ time-series analysis techniques to identify optimal intervals for unsupervised learning runs, potentially using algorithms like ARIMA or Prophet to forecast data accumulation rates. At 604, the system may utilize advanced clustering algorithms such as DBSCAN or HDBSCAN, which can identify clusters of varying densities and shapes in high-dimensional data. At 606, the system may implement semantic similarity measures like cosine similarity or Word Mover's Distance on word embeddings to compare new and existing sub-topics. At 608, system processing may involve hierarchical clustering techniques to integrate new sub-topics into the existing taxonomy, preserving relationships between categories. At 610, the system may use techniques like elastic weight consolidation or learning without forgetting to update the supervised model while retaining knowledge of existing categories. At 612, the system may employ transfer learning methods such as fine-tuning pre-trained language models (e.g., BERT or ROBERTa) on the new data. At 614, the system may utilize A/B testing or multi-armed bandit algorithms to gradually roll out the updated model and compare its performance against the previous version in real-time.

In the context of the tax software use case, at 602, the system may schedule monthly unsupervised learning runs to analyze recent tax-related queries, especially during tax season when new issues are likely to emerge. At 604, the system might identify a new cluster of queries related to cryptocurrency taxation, which has become increasingly common but doesn't fit into existing categories. At 606, the system may compare this potential "Cryptocurrency Taxation" sub-topic with existing categories like "Investment Income" or "Capital Gains" to determine if it's sufficiently distinct. At 608, the system may integrate "Cryptocurrency Taxation" into the taxonomy, defining the new category's beneficial features (e.g., specific cryptocurrencies, mining income, trading gains/losses) and establishing its relationship to broader categories like "Investment Income."

In this use case, at 610, the system may update the supervised learning model to recognize and classify queries related to cryptocurrency taxation, expanding its output layer and fine-tuning its parameters to identify relevant keywords and patterns. At 612, the model may be retrained using a combination of historical tax data and new examples of cryptocurrency-related queries, ensuring it can accurately categorize both traditional and emerging tax issues. At 614, the system may deploy the updated model to the tax software's production environment, enabling it to correctly categorize incoming queries about cryptocurrency taxation and provide appropriate responses or route them to specialized tax experts familiar with this emerging area of tax law.

Figure 7:
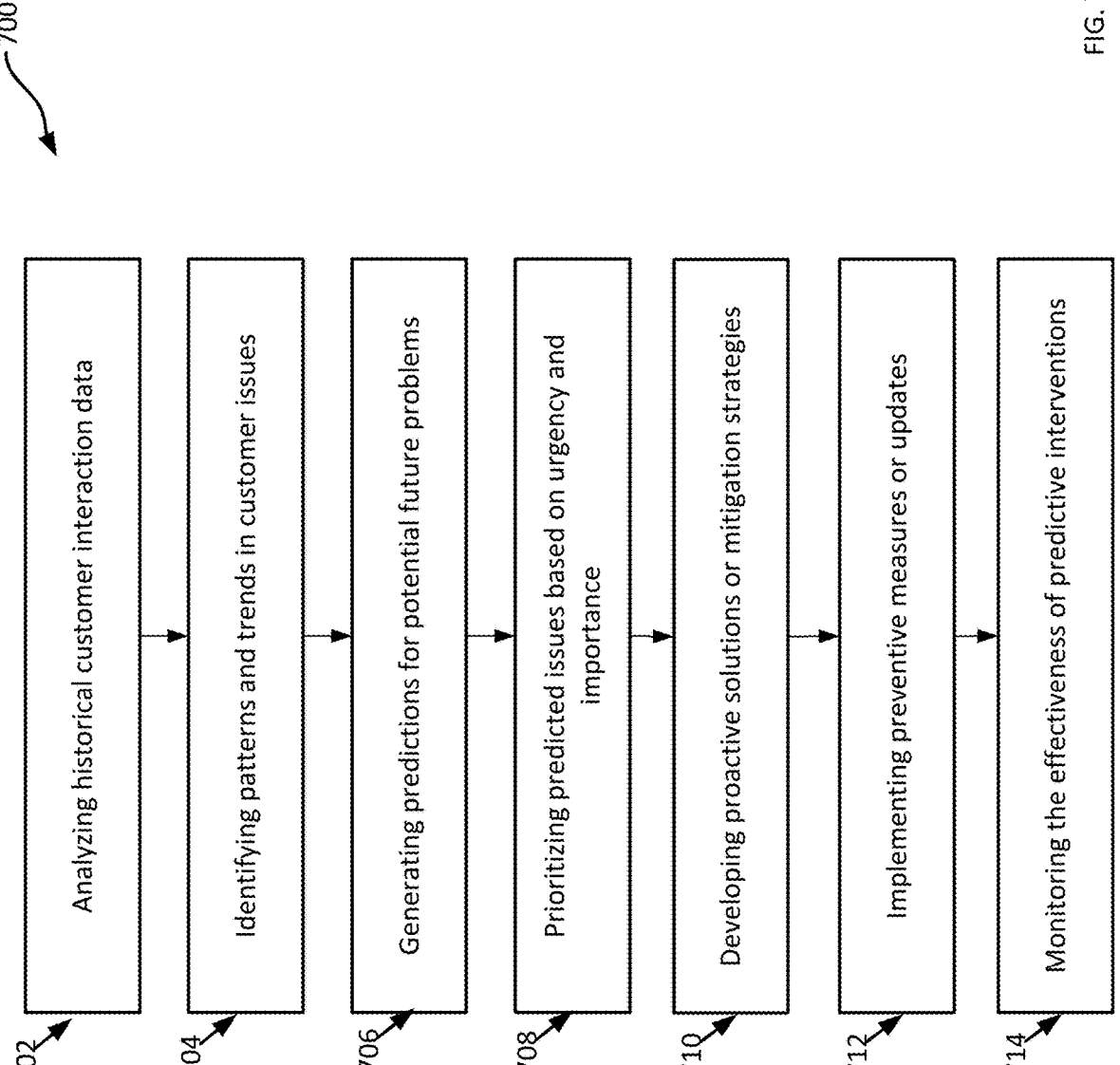
FIG. 7 illustrates a flowchart for a predictive analysis method for customer support, according to aspects of the present disclosure.

The automated support sub-topic classification system may include predictive analysis capabilities to anticipate and address potential customer support issues before they occur. FIG. 7 illustrates a flowchart for a predictive analysis method 700 for customer support. The method 700 may enable organizations to proactively identify and mitigate emerging customer issues, improving overall support efficiency and customer satisfaction.

At 702, system 100 may analyze historical customer interaction data. The processing and learning module 106 may access and process large volumes of past customer support interactions stored in the database 112. This analysis may include examining various data points such as the frequency of specific issues, seasonal trends, and correlations between different types of support requests. The processing and learning module 106 may employ various data mining and machine learning techniques to analyze the historical customer interaction data. These techniques may include time series analysis to identify seasonal patterns, clustering algorithms to group similar support requests, and correlation analysis to uncover relationships between different types of issues, allowing the system to extract meaningful insights from large volumes of past customer support interactions.

For example, the processing and learning module 106 may analyze customer support data from the past year to identify patterns in product-related queries following software updates. The module may examine factors such as the timing of support requests, the nature of reported issues, and the resolution rates for different types of problems.

At 704, system 100 may identify patterns and trends in customer issues. The processing and learning module 106 may apply advanced data mining and machine learning techniques to uncover recurring patterns and emerging trends in the analyzed historical data. The processing and learning module 106 may apply techniques such as association rule mining to discover relationships between different types of customer issues, and time series decomposition to separate seasonal, trend, and residual components in support request patterns. Additionally, the module may utilize natural language processing methods like topic modeling or named entity recognition to extract key themes and entities from customer support transcripts, enabling the identification of emerging trends or recurring problems across different product features or customer segments.

For instance, the module may discover that types of billing inquiries tend to spike at the beginning of each month, or that a particular product feature consistently generates a high volume of support requests during the first week after a software update. These insights may help support teams anticipate and prepare for predictable fluctuations in customer support needs.

At 706, system 100 may generate predictions for potential future problems based on the identified patterns and trends. The categorization and action module 108 may use predictive modeling techniques to forecast likely support issues and their potential impact on customer satisfaction and support resources. The system may employ various predictive modeling techniques such as time series forecasting, regression analysis, or machine learning algorithms like random forests or gradient boosting machines to generate predictions for potential future problems. These techniques may analyze historical patterns, seasonal trends, and correlations between different types of support requests to forecast the likelihood, volume, and nature of future customer issues, allowing the system to anticipate and prepare for upcoming support needs.

For example, if the system detects a rising trend in queries related to a specific product feature, the categorization and action module 108 may predict an increase in related support requests in the coming weeks. The module may also estimate the potential volume of these requests and their likely complexity based on historical data.

At 708, system 100 may prioritize predicted issues based on urgency and importance. The categorization and action module 108 may assess various factors such as the potential impact on customer satisfaction, the estimated volume of affected users, and the complexity of the predicted issues to determine their relative priority. The categorization and action module 108 may determine relative priority by evaluating multiple factors associated with each predicted issue. These factors may include the potential impact on customer satisfaction, the estimated number of users affected, and the complexity of the predicted issues. By analyzing and weighing these various elements, the system may assign priority levels to different predicted problems, allowing for more efficient allocation of resources and proactive addressing of the most critical issues.

For instance, a predicted surge in password reset requests may be assigned a lower priority compared to an anticipated increase in data security concerns. The prioritization process may help support teams allocate resources effectively and focus on addressing issues proactively.

At 710, system 100 may develop proactive solutions or mitigation strategies for the prioritized issues. The categorization and action module 108 may generate action responses to address the predicted problems before they escalate. The categorization and action module 108 may generate action responses by analyzing the predicted issues and their prioritization. The module may utilize predefined response templates, decision trees, or machine learning models trained on historical support data to determine the most appropriate actions for each anticipated problem. These generated responses may be customized based on the specific characteristics of the predicted issues, such as their complexity, urgency, and potential impact on users. These responses may include various options such as providing automated answers, routing queries to appropriate support agents, or escalating issues to a higher tier of support.

For example, if the system predicts an increase in queries about a new product feature, the categorization and action module 108 may automatically generate and update relevant FAQ entries in the knowledge base. The module may also prepare pre-defined response templates for support agents to use when addressing these anticipated queries.

At 712, system 100 may implement preventive measures or updates to address the predicted issues. The categorization and action module 108 may initiate various actions to mitigate potential problems before they impact a large number of users. The categorization and action module 108 may initiate various actions by triggering automated processes or alerting relevant teams to implement specific measures. These actions may include deploying software updates, modifying user interfaces, sending proactive notifications to users, or updating internal knowledge bases and support documentation to address the predicted issues before they become widespread problems.

For instance, if the system predicts a surge in login issues following a planned security update, the categorization and action module 108 may trigger the creation of a step-by-step troubleshooting guide. The module may also initiate the development of a self-service tool to help users resolve common login problems without needing to contact support directly.

At 714, system 100 may monitor the effectiveness of the predictive interventions. The processing and learning module 106 may track various metrics to assess the impact of the implemented preventive measures and proactive solutions.

For example, the processing and learning module 106 may compare the actual volume of support requests related to predicted issues against the forecasted numbers. The processing and learning module 106 may analyze customer feedback and resolution rates to evaluate the effectiveness of the proactive measures. This ongoing monitoring may help refine the predictive analysis process and improve the accuracy of future predictions.

The methods may use various algorithms to achieve their goal. For example, at 702, the system may employ time series analysis techniques such as ARIMA or Prophet to analyze historical data, while at 704 the system may utilize advanced clustering algorithms like DBSCAN or hierarchical clustering to identify patterns. At 706, the system may leverage machine learning models such as Random Forests or Gradient Boosting Machines for generating predictions, while at 708 the system may use multi-criteria decision analysis techniques to prioritize issues. At 710, the system may use natural language generation models like GPT to develop proactive solutions, and at 712 the system may utilize automated deployment pipelines for implementing preventive measures. At 714, the system may employ statistical process control techniques and A/B testing to monitor the effectiveness of interventions.

In the tax software use case, at 702, system processing may involve analyzing historical tax-related queries from previous years, identifying seasonal patterns such as increased inquiries about deductions near the tax filing deadline. At 704, the system might uncover trends like a growing number of questions about remote work deductions or changes in tax laws affecting small businesses. At 706, the system may predict a surge in queries about cryptocurrency taxation based on the increasing trend observed in recent months. At 708, the system may prioritize this cryptocurrency taxation issue due to its complexity and potential impact on a significant number of users.

In the use case, at 710, system processing may involve developing a comprehensive FAQ section on cryptocurrency taxation, including information on reporting requirements for different types of crypto transactions. At 712, the tax software may implement an update to include a dedicated section for cryptocurrency reporting in the tax preparation interface, along with in-app tooltips to guide users through this process. At 714, the system may monitor the effectiveness of these interventions by tracking the number of cryptocurrency-related queries, the accuracy of tax returns involving crypto transactions, and user feedback on the new features. This monitoring may reveal that while the FAQ and interface updates have reduced basic queries, there's still a need for more advanced guidance on complex crypto tax scenarios, prompting further refinement of the system's predictive and responsive capabilities.

Figure 8:
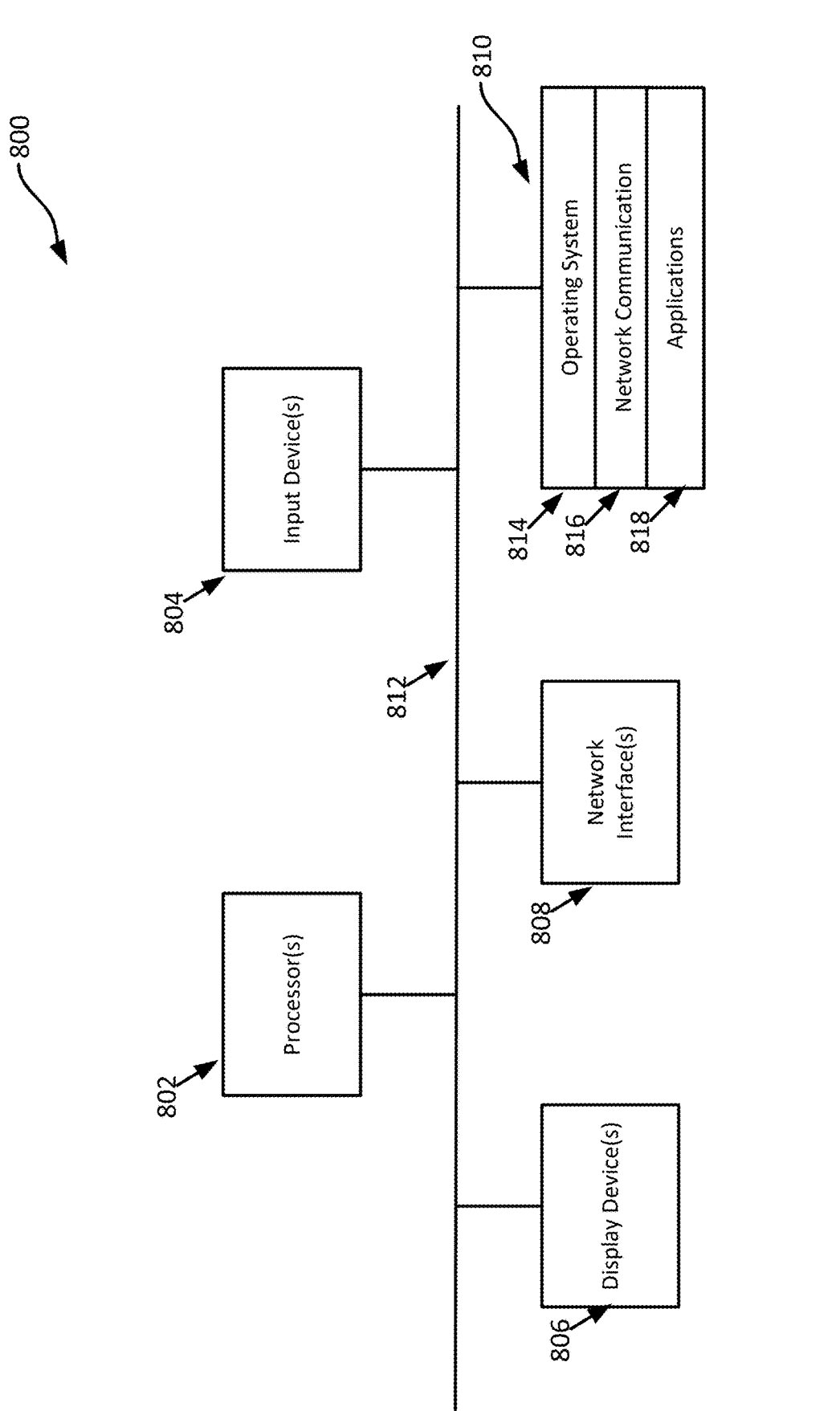
FIG. 8 illustrates a block diagram of a hardware system for automated support sub-topic classification, according to aspects of the present disclosure.

The automated support sub-topic classification system may be implemented using a hardware configuration as illustrated in FIG. 8. FIG. 8 shows a block diagram of a system 800 that may be used to execute the various components and methods described in the previous sections.

The system 800 may include a processor 802 that serves as the central processing unit for executing instructions and coordinating the operations of other components. The processor 802 may be a multi-core processor capable of parallel processing, which may enable efficient execution of complex machine learning algorithms and natural language processing tasks for automated support sub-topic classification.

An input device 804 may be connected to the system 800, allowing users or administrators to interact with the system. The input device 804 may include keyboards, mice, touchscreens, or other input peripherals. In some cases, the input device 804 may be used to input configuration parameters for the classification system or to manually review and adjust categorization results when beneficial.

A display device 806 may be included in the system 800 to provide visual output. The display device 806 may be used to present dashboards showing system performance metrics, visualizations of categorization results, or interfaces for system administrators to monitor and manage the automated support sub-topic classification process.

The system 800 may also include a network interface 808 for communicating with external systems and devices. The network interface 808 may enable the system 800 to receive incoming customer support queries from various channels, interact with external databases, or distribute processed results to other parts of the support infrastructure.

A software stack 810 may be implemented on the system 800 to provide the software components for automated support sub-topic classification. The software stack 810 may include an operating system 814 that manages hardware resources and provides basic system functionalities. The operating system 814 may be a specialized distribution optimized for machine learning and data processing tasks.

The software stack 810 may also include a network communication layer 816 that handles network-related operations. This layer may manage the protocols and processes for secure and efficient data transfer between the system 800 and external networks or devices.

At the top of the software stack 810, applications 818 may be implemented. These applications 818 may include the specific software implementations of the automated support sub-topic classification algorithms, machine learning models, and related tools described in previous sections.

A bus 812 may serve as the central communication pathway, allowing data transfer between all the components of the system 800. The bus 812 may enable high-speed data exchange, which may be beneficial for real-time processing of customer support queries and rapid categorization.

In a practical application, when a customer submits a support query through a user device 202, the query may be received by the system 800 through the network interface 808. The processor 802 may then execute the applications 818 to preprocess the query, generate LLM summaries, and perform categorization. The results may be stored in memory or sent back through the network interface 808 to the appropriate support channels or agents.

The system 800 may be designed to handle high volumes of concurrent support queries. For example, in a large e-commerce platform experiencing a surge during a holiday sale, the system 800 may process thousands of incoming queries simultaneously. The processor 802 may distribute the workload across its multiple cores, while the network interface 808 manages the influx of requests. The applications 818 may leverage the hardware resources to perform real-time categorization, enabling swift routing of queries to appropriate support teams or automated response systems.

Throughout this process, the display device 806 may show real-time analytics to support staff, such as the distribution of query categories, system performance metrics, and any anomalies that require attention. The input device 804 may allow support managers to adjust system parameters or manually intervene in complex cases that the automated system flags for human review.

By leveraging this hardware configuration, the automated support sub-topic classification system may efficiently process, categorize, and respond to customer support inquiries at scale, improving response times and overall customer satisfaction.

While the foregoing is directed to example embodiments described herein, other and further example embodiments may be devised without departing from the basic scope thereof. For example, aspects of the present disclosure (e.g., modules) may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are not limiting. It is intended that permutations, enhancements, equivalents, and improvements thereto are apparent to those skilled in the art upon a reading of the specification and a study of the drawings are included within the true spirit and scope of the present disclosure. It is therefore intended that the following appended claims include such modifications, permutations, and equivalents as fall within the true spirit and scope of these teachings.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed:

1. A method for automated support sub-topic classification, comprising:

collecting, by at least one processor, user transcripts and large language model (LLM) generated summaries of the transcripts;

performing, by the at least one processor, unsupervised learning to identify common themes in both the transcripts and the LLM generated summaries;

generating, by the at least one processor, sub-topics by analyzing the identified common themes through the unsupervised learning;

creating, by the at least one processor, labeled datasets by pairing the transcripts with the LLM generated summaries and the sub-topics generated from the common themes;

training, by the at least one processor, a supervised learning model using the labeled datasets to perform categorization of the user transcripts into the sub-topics;

performing, by the at least one processor using the trained supervised learning model, real-time categorization of a new user query into the sub-topics by generating an LLM summary of the new user query and inputting both the new user query and the LLM summary of the new user query into the trained supervised learning model; and generating, by the at least one processor, an action response to the new user query by selecting the action response corresponding to the categorization.

2. The method of claim 1, wherein preprocessing the collected transcripts comprises:

normalizing text in the user transcripts; and tokenizing, by the LLM, the user transcripts prior to the LLM generating the summaries of the transcripts.

3. The method of claim 1, wherein performing the unsupervised learning comprises:

applying a clustering algorithm to the transcripts and the summaries to identify groups of similar content.

4. The method of claim 1, wherein generating the sub-topics comprises:

analyzing the identified common themes;

grouping related themes; and assigning descriptive labels to each group of related themes.

5. The method of claim 1, wherein training the supervised learning model comprises:

splitting the labeled datasets into training and validation sets;

applying a machine learning algorithm to the training set;

evaluating the model's performance using the validation set; and periodically retraining the supervised learning model with new labeled datasets to improve categorization accuracy.

6. The method of claim 1, wherein generating the action response includes one or more of:

providing an automated answer to the query;

routing the query to an appropriate support agent;

escalating the query to a higher tier of support;

requesting additional information from the user;

providing relevant documentation or resources;

initiating a troubleshooting process;

scheduling a follow-up interaction; and updating a knowledge base with information from the query and response.

7. The method of claim 1, wherein performing the real-time categorization comprises:

extracting features from the new user query;

applying the trained model to the extracted features; and assigning a sub-topic category to the new user query by selecting the sub-topic category output by the model.

8. The method of claim 7, wherein generating the action response to the new user query comprises:

retrieving pre-defined action responses associated with the assigned sub-topic category;

selecting an appropriate action response by analyzing content of the new user query; and customizing the selected action response to address the new user query.

9. The method of claim 1, further comprising:

analyzing user feedback on the generated action responses; and updating the supervised learning model by incorporating the feedback into the training.

10. The method of claim 1, further comprising:

generating performance metrics for the categorization;

identifying the sub-topics with a categorization accuracy below a predetermined threshold according to the performance metrics; and refining the sub-topics and the labeled datasets for the sub-topics with the categorization accuracy below the predetermined threshold.

11. A system for automated support sub-topic classification, comprising:

a processor; and a memory storing instructions that, when executed by the processor, cause the system to:

collect, by a data collection module, user transcripts and large language model (LLM) generated summaries of the transcripts;

perform, by an unsupervised learning module, unsupervised learning to identify common themes in both the transcripts and the LLM generated summaries;

generate, by a sub-topic generation module, sub-topics by analyzing the identified common themes through the unsupervised learning;

create, by a dataset creation module, labeled datasets by pairing the transcripts with the LLM generated summaries and the sub-topics generated from the common themes;

train, by a model training module, a supervised learning model using the labeled datasets to perform categorization of the user transcripts into the sub-topics;

perform, by the trained supervised learning model, real-time categorization of a new user query into the sub-topics by generating an LLM summary of the new user query and inputting both the new user query and the LLM summary of the new user query into the trained supervised learning model; and generate, by an action response module, an action response to the new user query by selecting the action response corresponding to the categorization.

12. The system of claim 11, wherein preprocessing the collected transcripts comprises:

normalizing, by a text normalization module, text in the user transcripts; and tokenizing, by the LLM, the user transcripts prior to the LLM generating the summaries of the transcripts.

13. The system of claim 11, wherein performing the unsupervised learning comprises applying, by the unsupervised learning module, a clustering algorithm to the transcripts and the summaries to identify groups of similar content.

14. The system of claim 11, wherein generating the sub-topics comprises:

analyzing, by the sub-topic generation module, the identified common themes;

grouping, by the sub-topic generation module, related themes; and assigning, by the sub-topic generation module, descriptive labels to each group of related themes.

15. The system of claim 11, wherein training the supervised learning model comprises:

splitting, by the model training module, the labeled datasets into training and validation sets;

applying, by the model training module, a machine learning algorithm to the training set;

evaluating, by the model training module, the model's performance using the validation set; and periodically retraining, by the model training module, the supervised learning model with new labeled datasets to improve categorization accuracy.

16. The system of claim 11, wherein generating the action response includes one or more of:

providing, by the action response module, an automated answer to the query;

routing, by the action response module, the query to an appropriate support agent;

escalating, by the action response module, the query to a higher tier of support;

requesting, by the action response module, additional information from the user;

providing, by the action response module, relevant documentation or resources;

initiating, by the action response module, a troubleshooting process;

scheduling, by the action response module, a follow-up interaction; and updating, by the action response module, a knowledge base with information from the query and response.

17. The system of claim 11, wherein performing the real-time categorization comprises:

extracting, by a feature extraction module, features from the new user query;

applying, by the trained model, the trained model to the extracted features; and assigning, by the trained model, a sub-topic category to the new user query by selecting the sub-topic category output by the model.

18. The system of claim 17, wherein generating the action response to the new user query comprises:

retrieving, by the action response module, pre-defined action responses associated with the assigned sub-topic category;

selecting, by the action response module, an appropriate action response by analyzing content of the new user query; and customizing, by the action response module, the selected action response to address the new user query.

19. The system of claim 11, wherein the instructions further cause the system to:

analyze, by a feedback analysis module, user feedback on the generated action responses; and update, by the model training module, the supervised learning model by incorporating the feedback into the training.

20. A method for automated support sub-topic classification, comprising:

receiving, by at least one processor, a new user query;

performing, by the at least one processor using a trained supervised learning model, real-time categorization of the new user query into sub-topics by generating a large language model (LLM) summary of the new user query and inputting both the new user query and the LLM summary of the new user query into the trained supervised learning model, wherein the trained supervised learning model is trained using labeled datasets created by pairing user transcripts with the LLM generated summaries and the sub-topics generated based on common themes identified through unsupervised learning of both the user transcripts and the LLM generated summaries; and generating, by the at least one processor, an action response to the new user query in response to the categorization.

* * * * *